United States Patent
Shao et al.

(10) Patent No.: US 12,526,605 B2
(45) Date of Patent: Jan. 13, 2026

(54) MULTICAST BROADCAST SERVICE SIMULTANEOUS TRANSMISSION USING DOWNLINK NON-ORTHOGONAL MULTIPLE ACCESS (NOMA)

(71) Applicant: MediaTek Singapore Pte. Ltd., Singapore (SG)

(72) Inventors: Xuanbo Shao, Beijing (CN); Xuelong Wang, Beijing (CN)

(*) Notice: Subject to any disclaimer, the term of this patent is extended or adjusted under 35 U.S.C. 154(b) by 304 days.

(21) Appl. No.: 17/710,876

(22) Filed: Mar. 31, 2022

(65) Prior Publication Data

US 2022/0312155 A1    Sep. 29, 2022

Related U.S. Application Data

(63) Continuation of application No. PCT/CN2021/083519, filed on Mar. 29, 2021.

(51) Int. Cl.
  *H04W 4/06*    (2009.01)
  *H04L 1/00*    (2006.01)
  (Continued)

(52) U.S. Cl.
  CPC ............ *H04W 4/06* (2013.01); *H04L 1/0003* (2013.01); *H04L 1/0008* (2013.01);
  (Continued)

(58) Field of Classification Search
  None
  See application file for complete search history.

(56) References Cited

U.S. PATENT DOCUMENTS

2016/0088646 A1* 3/2016 Sun ............... H04L 1/0028 370/329
2016/0119807 A1* 4/2016 Sun ............... H04L 5/0091 370/252
(Continued)

FOREIGN PATENT DOCUMENTS

CN    106416109 A    6/2015
CN    111371482 A    7/2020
(Continued)

OTHER PUBLICATIONS

China Intellectual Property Office Action, dated Apr. 27, 2023 (8 pages).
(Continued)

*Primary Examiner* — Kodzovi Acolatse
(74) *Attorney, Agent, or Firm* — Helen Mao; Imperium Patent Works

(57) ABSTRACT

Apparatus and methods are provided for multiple non-orthogonal multiple access (NOMA) layer each independently encoded with different configuration parameters, including MCS and NOMA spreading sequences. In one embodiment, the UE obtains NOMA configuration parameters for the DL data packets, decodes and reconnects multiple PDUs from the NOMA configuration parameters, and delivers decoded PDUs to upper layers of the UE. In one embodiment, the UE obtains the NOMA configuration parameters from a modified downlink control information (DCI). In another novel aspect, the base station partitions MBS data packets into multiple NOMA layers, encodes data packets for each NOMA layer with corresponding NOMA encoder, wherein each NOMA encoder is configured with independent NOMA configuration parameters, performs performing symbol alignment for encoded data packets from the multiple NOMA encoders, superimposes aligned data
(Continued)

packets for the multiple MBS sessions into one RF channel to be transmitted to the UEs.

20 Claims, 7 Drawing Sheets

(51) Int. Cl.
  *H04L 5/00* (2006.01)
  *H04W 72/0446* (2023.01)
  *H04W 72/0453* (2023.01)
  *H04W 72/23* (2023.01)

(52) U.S. Cl.
  CPC ....... *H04L 5/0005* (2013.01); *H04W 72/0446* (2013.01); *H04W 72/0453* (2013.01); *H04W 72/23* (2023.01)

(56) References Cited

U.S. PATENT DOCUMENTS

| | | | | |
|---|---|---|---|---|
| 2016/0285525 A1* | 9/2016 | Budianu | ............... | H04L 5/0057 |
| 2018/0076993 A1* | 3/2018 | Seo | ..................... | H04L 27/2604 |
| 2018/0091959 A1* | 3/2018 | Sun | ..................... | H04W 52/262 |
| 2018/0213366 A1* | 7/2018 | Seo | ..................... | H04W 52/143 |
| 2019/0150097 A1* | 5/2019 | Seo | ........................ | H04W 52/14 370/329 |
| 2019/0363843 A1* | 11/2019 | Gordaychik | .............. | H04L 1/08 |
| 2019/0393998 A1* | 12/2019 | Lei | ........................ | H04W 88/02 |
| 2020/0028611 A1 | 1/2020 | Lee | | |
| 2020/0092056 A1* | 3/2020 | Lei | ........................ | H04L 5/0012 |
| 2020/0396034 A1* | 12/2020 | Chou | ................... | H04L 1/0061 |

FOREIGN PATENT DOCUMENTS

| WO | WO-2017039240 A1 * | 3/2017 | ............... H04L 1/00 |
|---|---|---|---|
| WO | WO-2017078413 A1 * | 5/2017 | ........... H04B 7/0695 |

OTHER PUBLICATIONS

Taiwan Intellectual Property Office Action, dated Oct. 11, 2022 (9 pages).
China Intellectual Property Office Action notice of allowance 202210174291.0, dated Oct. 23, 2024.
China Intellectual Property Office Action 202210174291.0, Dated Apr. 12, 2025.

* cited by examiner

MULTICAST BROADCAST SERVICE SIMULTANEOUS TRANSMISSION USING DOWNLINK NON-ORTHOGONAL MULTIPLE ACCESS (NOMA)

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/083519, titled "Methods and apparatus of Multicast Service simultaneous transmission using DL NOMA," with an international filing date of Mar. 29, 2021. This application claims priority under 35 U.S.C. § 119 from Chinese Application Number 202210174291.0 titled "Multicast Broadcast Service Simultaneous Transmission Using Downlink Non-Orthogonal Multiple Access (NOMA)" filed on Feb. 24, 2022. The disclosure of each of the foregoing documents is incorporated herein by reference.

TECHNICAL FIELD

The disclosed embodiments relate generally to wireless communication, and, more particularly, to reliable multicast broadcast service simultaneous transmission using downlink (DL) non-orthogonal multiple access (NOMA).

BACKGROUND

With the rapid development of mobile communication system, the demand of multicast broadcast service (MBS) is emerging, e.g., popular media content, live stream, video distribution, vehicle-to-everything (V2X) communication, public safety (PS) communication and so on. In these cases, gNB can send a multicast or broadcast services to very larger number of UEs consuming the same data, which can decrease the physical downlink control channel signalling overhead to some extent. However, the legacy cellular multicast broadcast services only focus on the orthogonal frequency resource to transmit multiple multicast broadcast services or/and unicast, e.g., time domain multiplexing (TDM) or frequency domain multiplexing (FDM). When there are multiple multicast broadcast services, it requires one by one sequential DL transmission.

Considering the variety of multicast broadcast services and limited spectrum resource, the sequential transmission of multiple services or one service with different service quality is inefficient. In traditional cellular system, UE will report the channel information state (CSI) to gNB, and the upper layer will determine reasonable transport block size which can be carried by physical layer. Then, the radio link control (RLC) layer will transmit corresponding service segmentation parts to MAC layer and padding will be added if the RLC service contents are not enough to assemble a MAC packet data unit (PDU). For emerging multicast broadcast services, it will have more bits to be transmitted at upper layer, especially the high-quality service. If legacy method as mentioned above is used to deliver the data packet from the RLC layer to MAC layer, it can cause the services congestion and increase the services latency.

Improvements and enhancements are required to improve efficiency of MBS, which is limited by the sequential transmission for the wireless network.

SUMMARY

Apparatus and methods are provided for multiple non-orthogonal multiple access (NOMA) layer each independently encoded with different configuration parameters, including MCS and NOMA spreading sequences. In one embodiment, the UE receives DL MBS data packets, which are encoded with multiple independently encoded NOMA layers that are superimposed onto one or more time-frequency resources. The UE obtains NOMA configuration parameters for the DL data packets, decodes and reconnects multiple PDUs based on the NOMA configuration parameters, and delivers decoded PDUs to upper layers of the UE. In one embodiment, the UE obtains the NOMA configuration parameters from a modified downlink control information (DCI) received from the NR wireless network. In one embodiment, the one or more NOMA configuration parameters are defined within group common fields of the DCI with each DCI field corresponding to one UE, or a mixed NOMA configuration parameter table is configured containing all NOMA encoding parameter combinations for UEs, or the DCI is a unicast DCI to inform one or more NOMA configuration parameters. In another embodiment, the NOMA configuration parameters further comprise channel encoder, and power ratio.

In another novel aspect, the gNB partitions data packets for multiple MBS sessions into multiple NOMA layers, wherein a MBS session provides an MBS with a QoS for a UE, encodes data packets for each NOMA layer with corresponding NOMA encoder, wherein each NOMA encoder is configured with independent NOMA configuration parameters for the PHY layer, performs symbol alignment for encoded data packets from the multiple NOMA encoders, superimposes aligned data packets for the multiple MBS sessions from the multiple NOMA encoder into one or more time-frequency resource elements, and transmits simultaneously the multiple MBS sessions to one or more UEs. In one embodiment, padding is performed for data packets partitioned for a NOMA layer when a size of the data packets for the corresponding NOMA layer is smaller than a transport block size configured for the corresponding NOMA layer. In other embodiments, data segmentation is performed for a NOMA layer when a size of the data packets for the corresponding NOMA layer is larger than a transport block size configured for the corresponding NOMA layer and sequential or concurrent transmission of each data segment is performed.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (Collectively referred to as "elements"). These elements may be implemented using electronic hardware, computer software, or any combination thereof. Whether such elements are implemented as hardware or software depends upon the particular application and design constraints imposed on the overall system.

Figure 1:
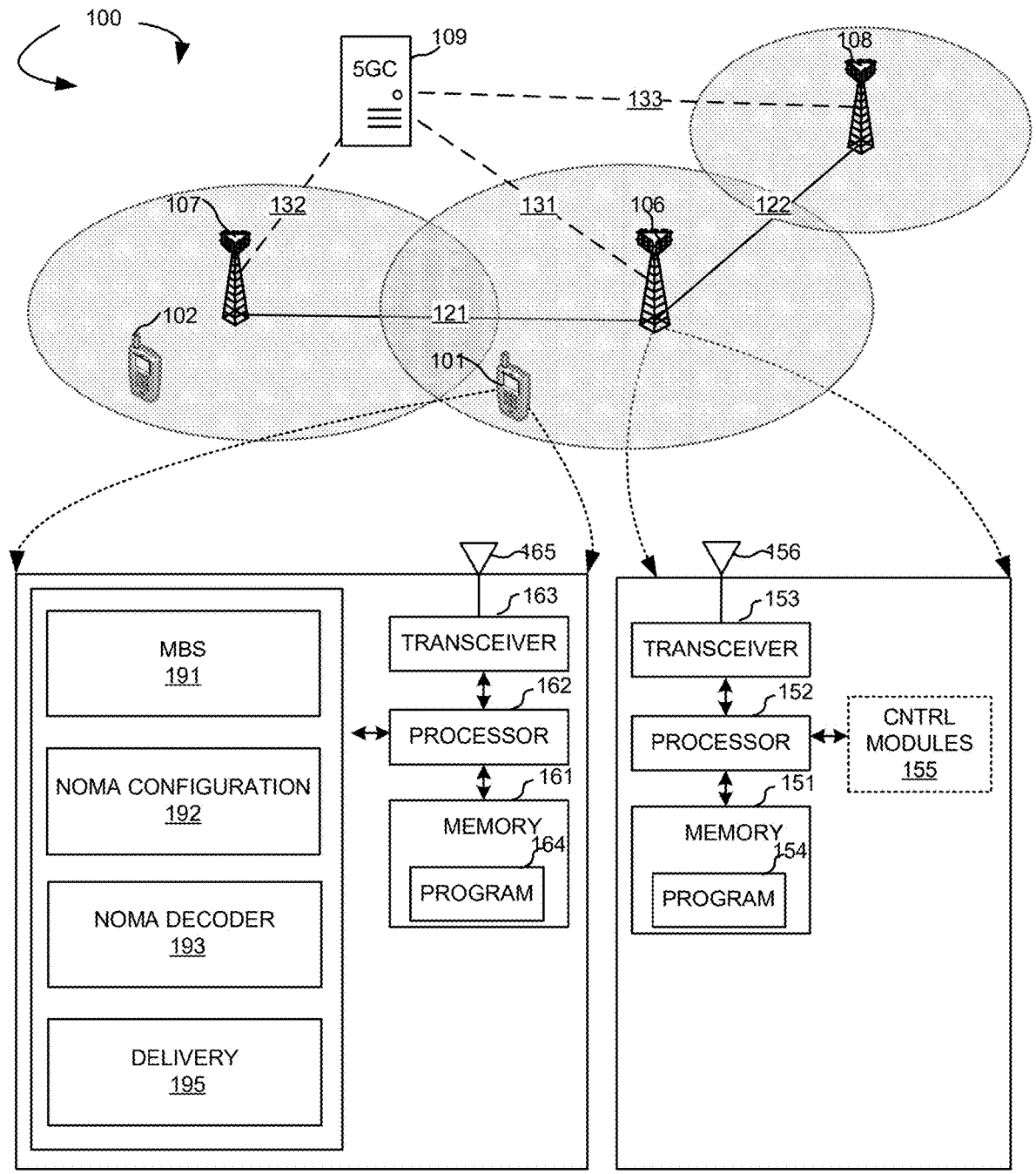
FIG. 1 is a schematic system diagram illustrating an exemplary wireless network that supports independently configured NOMA layers for MBS.

FIG. 1 is a schematic system diagram illustrating an exemplary wireless network that supports independently configured NOMA layers for MBS. Aspects of the present disclosure provide methods, apparatus, processing systems, and computer readable mediums for NR (new radio access technology, or 5G technology) or other radio access technology. NR may support various wireless communication services. These services may have different quality of service (QoS) requirements, latency requirements, connected density and reliability requirements. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively. In one embodiment, gNB 106 and gNB 107 provide the same MBS. The service continuity during handover is guaranteed when UE 101 moves from gNB 106 to gNB 107 and vice versa. The area covered by gNB 106 and 107 with the same MBS is a multi-cast service area for the MBS.

In one novel aspect, multiple independent NOMA layers each with independent NOMA configuration parameters are used to encode and superimpose multiple MBS sessions onto the same time-frequency resource elements (REs) or one radio frequency (RF) channel. With the development of variety of multicast broadcast services and limited spectrum resource, it requires simultaneous transmission of multiple services or one service with different service quality to improve the system efficiency. Layered downlink non-orthogonal multiple access (DL NOMA) technology which superimposes multiple concurrent data packet in the same time/frequency domain is considered as a promising solution to enhance the spectrum utilization efficiency. Theoretically, it also increases the system capacity compared with orthogonal multiple access technology. The multiple multicast broadcast services or the same services with different quality packet streams (e.g., high definition and ultra-high-definition video) can be delivered to different NOMA layers, and be superimposed in the same time/frequency resource. On the UE side, considering that different services or one services with different quality flows are simultaneous transmitted with layer division structure, the coordination and combination of different layers are critical to achieve excellent user experience, e.g., the synchronization is required to different layers which deliver different QoS data flows from MAC layer, especially for the same service with different quality requirement. Due to the service requirement difference of different layers, each layer can use independent modulation and coding scheme (MCS), spreading sequence, and power ratio. Coordination, including services synchronization and symbol alignment, among different NOMA layers with separate MCS and spreading sequence indication for a group of UEs needs to be provided.

In one embodiment, the MAC layer is configured with one-to-one mapping to NOMA layer. Each NOMA layer is independently encoded with different MCS, NOMA spreading sequence, etc. Then multiple NOMA layers are superimposed at the same time/frequency resource and transmitted within one RF channel. The partitioning and padding module partition the MAC PDU delivered from the upper layer into multiple sub-layer and/or add padding bits (e.g., zero padding) before mapping to NOMA layer in order to achieve symbol alignment of different layer. Subsequently, multiple layers' packet streams are combined together at the same time/frequency resource via DL NOMA and transmitted within one RF channel.

FIG. 1 further illustrates simplified block diagrams of a base station and a mobile device/UE for MBS transmission. gNB 106 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. These control modules can be implemented by circuits, software, firmware, or a combination of them.

FIG. 1 also includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver 163 may comprise two RF modules (not shown) which are used for different frequency bands transmitting and receiving. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. An MBS module 191 receives downlink (DL) data packets for an MBS from a network entity in the wireless network, wherein the DL data packets are encoded with multiple independently encoded NOMA layers that are superimposed onto one or more time-frequency resource elements (REs). A NOMA configuration module 192 obtains NOMA configuration parameters for the DL data packets. A NOMA decoder 193 decodes and reconnects multiple packet data units (PDUs) of the encoded DL data packets received from a PHY layer of the UE based on the NOMA configuration parameters. A delivery module 194 delivers decoded PDUs to upper layers of the UE.

Figure 2A:
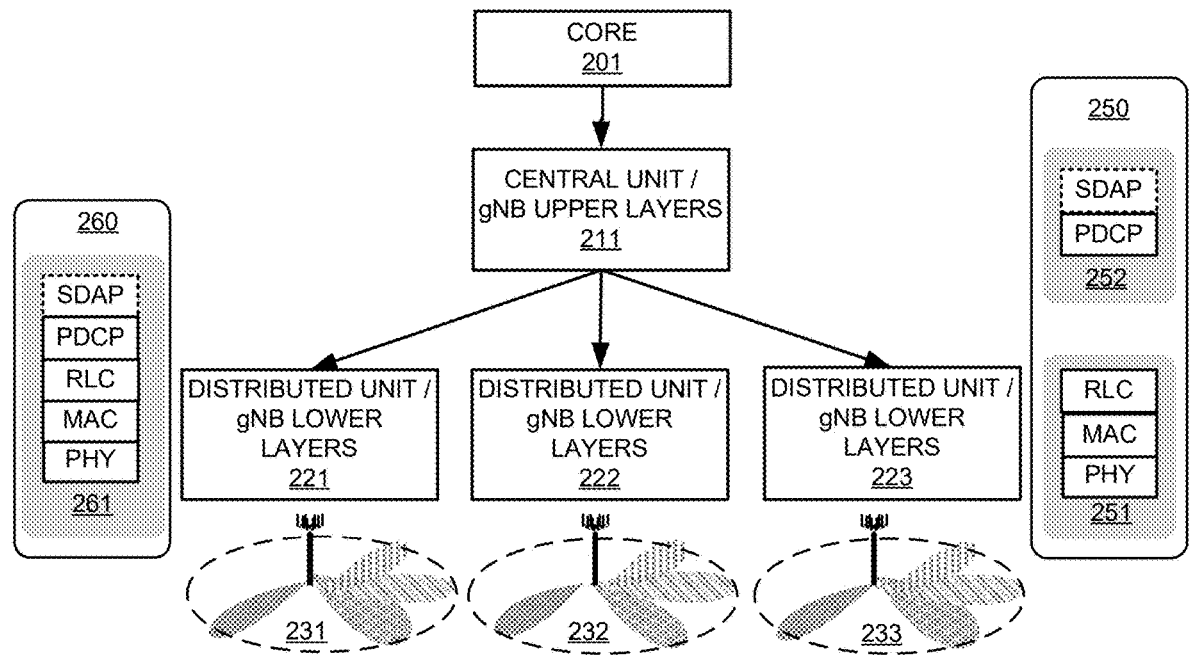
FIG. 2A illustrates an exemplary NR wireless system with centralized upper layers of the NR radio interface stacks.

FIG. 2A illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 2B:
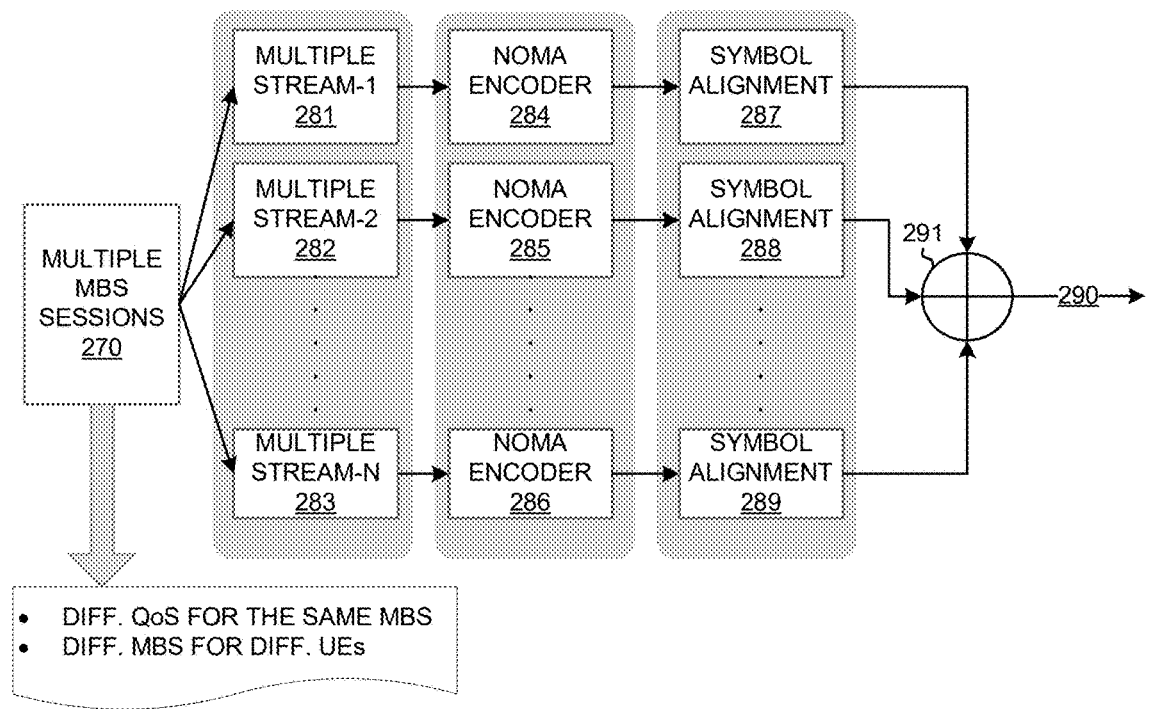
FIG. 2B illustrates exemplary top-level diagrams for the multiple independent NOMA layer encoders for multiple MBS sessions

FIG. 2B illustrates exemplary top-level diagrams for the multiple independent NOMA layer encoders for multiple MBS sessions. Multiple MBS sessions 270 are partitioned to multiple streams, including multiple stream-1 281, multiple stream-2 282, and multiple stream-N 283. Each MBS session provides a predefined QoS for a UE. A same MBS can be provided with different QoSs, such as high definition (HD), ultra HD (UHD) for the same MBS. The MBS with the same QoS can be provided to different UEs. In certain systems, such as NR systems, NR multicast broadcast service is transmitted in the coverage or some dedicated group of a cell. The upper layer delivers different QoS flows, such as multiple stream-1 281, multiple stream-2 282, and multiple stream-N 283 to MAC layer in parallel. The MAC layer will be mapped to NOMA layer. Multiple stream-1 281 maps to NOMA layer with NOMA encoder 284. Multiple stream-2 282 maps to NOMA layer with NOMA encoder 285. Multiple stream-N 283 maps to NOMA layer with NOMA encoder 286. Different NOMA layer can use independent modulation and coding scheme (MCS), NOMA spreading sequence, and power ratio. Besides, in some cases, the coordination (service/symbol synchronization) or combination of different layers are critical to achieve more excellent user experience and service dedicated requirement. For example, the left view and right view of a same video content can be delivered independently from upper layer to physical layer, UE can combine the left view and right view and obtain the stereoscopic 3D video component if the sampling of different layer is aligned. With the layered NOMA structure, it can transmit more bits than that of transport block size from RLC layer to MAC layer and partition them into multiple segments and each corresponds to one NOMA layer.

Symbol alignment is performed for each independently encoded data packets. Symbol alignment 287, 288, and 289 are performed for outputs of NOMA encoders 284, 285, and 286, respectively. From physical layer perspective, after coded by NOMA encoder (including channel encoder, bit-interleaving, bit scrambling, QAM modulation, and spreading as mentioned below), two or multiple data streams delivered from upper layer can be superposed together, at step 291, in the same time/frequency resource before actual OFDM modulation. The data packets are transmitted over a single RF channel, at step 290, which can enable flexible usage of the limited spectrum resource for multicast broadcast services.

Figure 3:
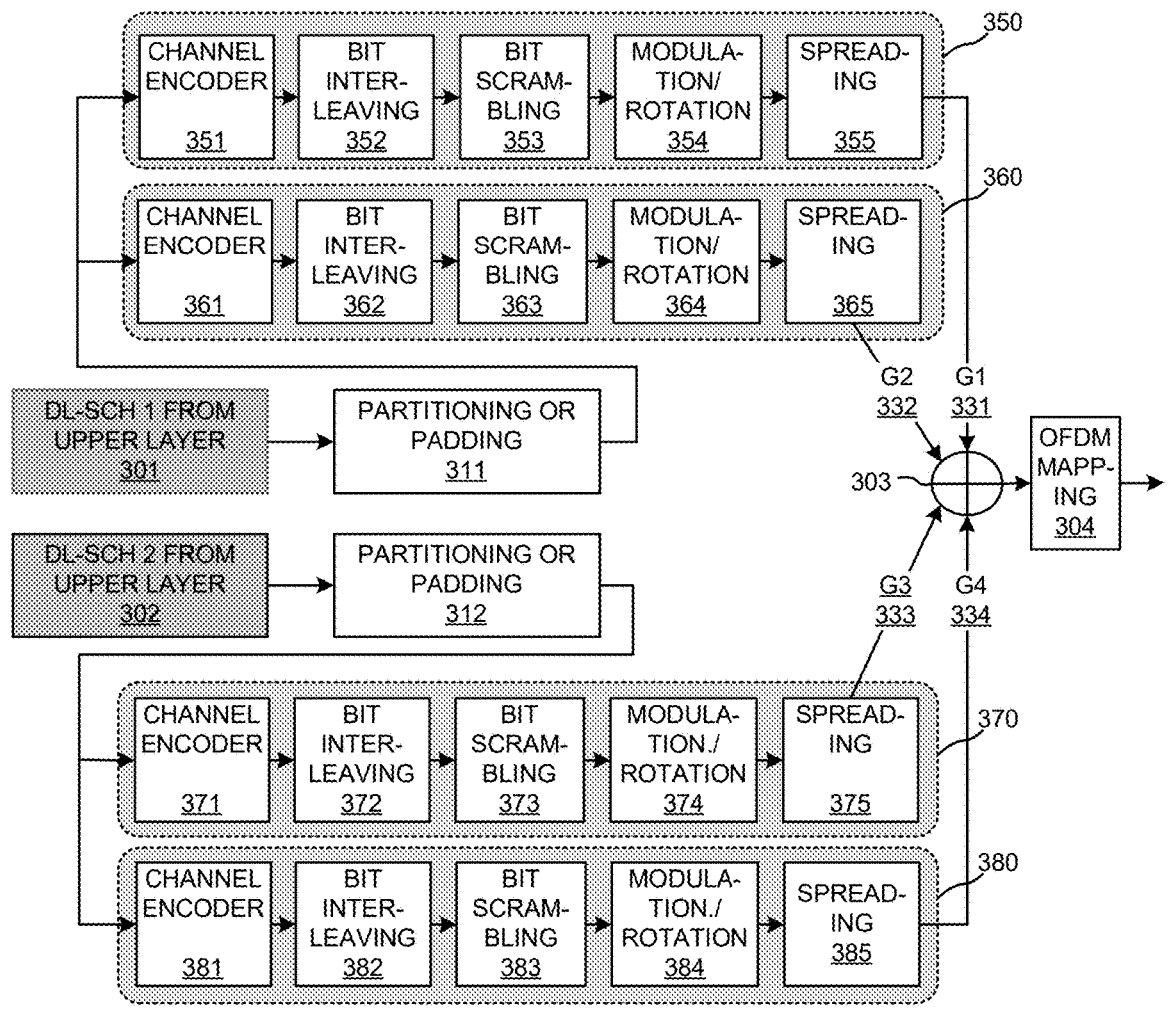
FIG. 3 illustrates exemplary diagrams of two independent data flows delivered from the upper layer and partitioned into multiple NOMA layers.

FIG. 3 illustrates exemplary diagrams of two independent data flows delivered from the upper layer and partitioned into multiple NOMA layers. Two independent downlink data streams for shared channel (SCH), including DL-SCH-1 301 and DL-SCH-2 302 are received from upper layers. Based on one or more configurations or conditions, each data flow is divided into two or more segments, with partitioning or padding functions 311 for DL-SCH-1 301 and 312 for DL-SCH-2 302. The one or more configuration or conditions include the limitation of the size of the transport block, dedicated purposes, such as enhancement of spectrum efficiency and/or decreasing system latency. Each segment corresponds to one NOMA layer. NOMA layer 350 and NOMA layer 360 are used for NOMA encoding for the two portioned data packets from DL-SCH-1 301. NOMA layer 370 and NOMA layer 380 are used for NOMA encoding for the two layered data packets from DL-SCH-2 302. Different NOMA layers can be used for different requirements, such as different Qos (HD/UHD) for one service. Each NOMA layer uses independent channel encoder (e.g., low density parity check code, polar code and so on), bit interleaving, bit scrambling, QAM constellation and spreading code, the operation also can be named as NOMA encoder. NOMA encoder for NOMA layer 350 includes channel encoder 351, bit interleaving 352, bit scrambling 353, modulation/rotation 354, and spreading 355. NOMA encoder for NOMA layer 360 includes channel encoder 361, bit interleaving 362, bit scrambling 363, modulation/rotation 364, and spreading 365. NOMA encoder for NOMA layer 370 includes channel encoder 371, bit interleaving 372, bit scrambling 373, modulation/rotation 374, and spreading 375. NOMA encoder for NOMA layer 380 includes channel encoder 381, bit interleaving 382, bit scrambling 383, modulation/rotation 384, and spreading 385. In one embodiment, each layer or each service also can have a layer-dedicated or services-dedicated interleaving/scrambling sequence.

In one embodiment, the non-orthogonal spreading code (NSC) modules, such as spreading module 355, 365, 375, and 385, are used for simultaneous receiving multicast broadcast services. A well-designed low cross-correlation NSC differentiates each layer's data packet and decreases the interference among layers. Each NOMA layer will be allocated a dedicated NSC. Generally, the length of NSC (K) will be less than the number of NOMA layer (M), and the ratio K/M is called overloading factor (K/M>1 for NOMA system), which is positive relevant with the spectrum efficiency. For example, after QAM modulation, each layer's modulated symbol (e.g., $(\sqrt{2}+\sqrt{2}j)/2$) will multiply with layer-dedicated NSC and the modulated symbol can be spread with K resource elements (REs). Finally, the M layer's modulated and spreading symbols are superimposed at the K REs.

Encoding with multiple NOMA layers has higher spectrum utilization efficiency than that of legacy NR system, where M users will occupy M orthogonal time/frequency domain resources using time domain multiplexing or frequency domain multiplexing method, the overloading factor is 1. According to the channel condition or services quality, each layer will be allocated a power factor, such as G1 331 for NOMA layer 350, G2 332 for NOMA layer 360, G3 333 for NOMA layer 370, and G4 334 for NOMA layer 380. Subsequently, the layer superposition is performed. The coding unit size is adapted depending on the NSC length, modulation order and code rate that is used. At step 303, once all the layer's data are encoded by NOMA encoder, they are combined into a single NOMA signal ensemble after power allocation. Finally, at step 304, the OFDM signal is generated and transmitted within one RF channel using the same time/frequency resource. The illustrated multiple DL data streams can be extended to more than two services or/and each service with multiple quality based sub-layer, the NOMA layer number will be increased correspondingly, with each partitioned data stream corresponding to one independent NOMA encoder/layer.

In one embodiment, to avoid the L1 signaling overhead, the group common physical downlink control channel which contains downlink group common downlink control information (DCI) is used to notify the UE how and where to receive the group common physical downlink shared information, e.g., the time and frequency resource information, etc. However, each UE or each layer can use different physical parameter e.g., MCS, based on different services requirement or user experience. In legacy NR cellular system, only one "modulation and coding scheme" field is carried in DCI, which only can indicate a MCS value, and it is not suitable to multiple UEs with different MCS requirement as described in this disclosure.

In one embodiment, modified DCI is used for NOMA configuration parameters. Multiple "modulation and coding scheme" fields within one group common DCI can be introduced to indicate which MCS is configured for receiver UE and the fields have a predefined relationship with UEs. Alternatively, only one "modulation and coding scheme" field within one group common DCI is configured, when network establish a mixed MCS table containing all UE's MCS combination. In another embodiment, a dedicated unicast DCI is used to notify which MCS value will be used for receiving multicast broadcast services. In this case, one "modulation and coding scheme" field is configured in the dedicated unicast DCI.

In one embodiment, the modified DCI also includes independent NOMA spreading information for each NOMA encoder/layer to perform spreading after QAM modulation. The similar method used for notifying MCS can be reused for indicating the UE specific spreading code, e.g., multiple "spreading code index" fields can be added within one group common DCI and each corresponds to a dedicated UE. In another embodiment, only one "spreading code index" field within one group common DCI is configured when network setup a mixed mapping combination indicating the relationship of each UE's spreading code or a "spreading code index" is introduced in dedicated unicast DCI and to notify which spreading code will be used for upcoming multicast broadcast services.

In one embodiment, multiple streams, such as DL-SCH-1 301 and DL-SCH-2 302, are configured for one MBS based on predefined rules. In one scenario, for UHD and HD simulcast broadcast delivery, the left view and the right view of a stereoscopic 3D video component can be a UHD video and a HD video, respectively. There is no dependency between two views as two views are coded independently and decoded independently from physical layer perspective. That is, a receiver with normal channel quality can acquire HD right view video data from a physical channel and offers a HD service to the user. Another receiver with better channel quality can acquire UHD video data from a different physical channel and offers a UHD service to the user. Moreover, when a receiver can get data from two physical channels simultaneously, the receiver acquires an UHD left view and a HD right view video simultaneously and provides a 3D service by combining two views to the user. By using layered based simultaneous transmission mechanism, the HD right view can be coded in a base layer (which also can be referred as core layer) and the UHD left view can be coded through enhanced layer (e.g., with the source coding scheme of HEVC).

For example, for DL-SCH-1 301 data stream from upper layer, NOMA layer 350 is configured to transmit the base layer and NOMA layer 360 is configured to deliver the enhanced layer. The NOMA layer 350 (i.e. the base layer) is transmitted with high power and low-level modulation (e.g. QPSK) and coding scheme, which can be received by the UEs at both cell center and cell edge. NOMA layer 360 (i.e. the enhanced layer) is transmitted with low power and high-level modulation (e.g. 1024QAM) and coding scheme, which can be only received by the UEs at cell center, as the UEs at cell center have better radio signal quality. In the receiver implementation of this system, the receiver cancels out the base layer data from the superimposed receiver data in order to obtain higher performance for enhanced layer. The cell edge users can receive the HD right view of the MBS service. The cell center receiver can acquire HD right view firstly and cancel out the HD right view data to obtain UHD left view services, which also can acquire the 3D UHD view by using both the base and the enhanced layers from two physical channels and the receiver displays 3D service by combining two views.

With multi-layered NOMA encoder, one video stream can be mapped into independent NOMA layer and coded by multiple different encoders for different user experience. When the independent NOMA encoders are transmitted via same physical channel subject to superposition transmission, synchronized transmission is required at the transmitter side to ensure the presentation of the picture for an instant sample of a particular video stream at the receiver side. The coding streams are produced at information source by application layer via specific codec. They will go across high layer protocol stack before its transmission over the channel at physical layer.

Figure 4:
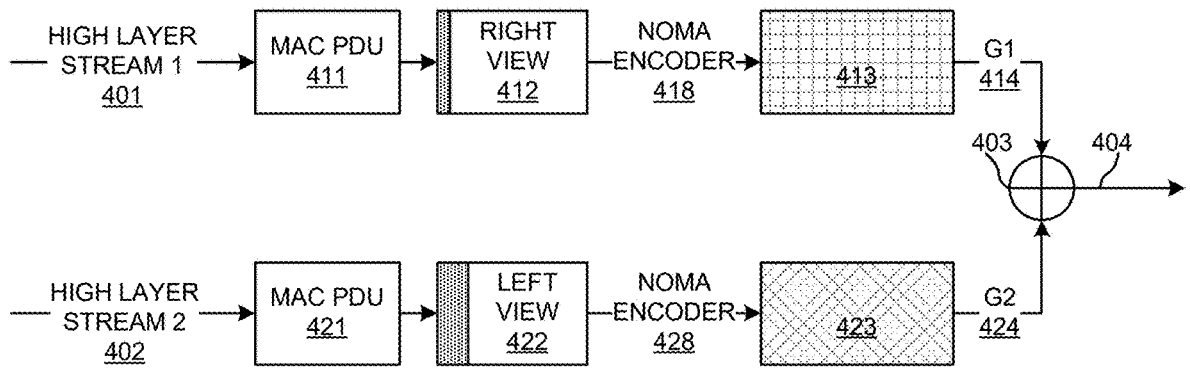
FIG. 4 illustrates an exemplary diagram of using multi-layered data flow to deliver the packet streams of left view and right view independently from higher layer.

FIG. 4 illustrates an exemplary diagram of using multi-layered data flow to deliver the packet streams of left view and right view independently. Two data flows are delivered from the upper layer, stream-1 401 for the right view and stream-2 402 for the left view. As an example, assuming that for a MBS, the right view corresponds to HD video and the left view corresponds to the UHD video. Right view stream-1 401 from the upper layer are coded to MAC PDU 411. Left view stream-2 402 from the upper layer are coded to MAC PDU 421. The left view and right view packets are portioned and performing data padding when needed. The resulting two layer's packets with padding 412 and 422, are mapped in physical layer to different NOMA layers. The packets go across independent NOMA encoder, NOMA encoder 418 and NOMA encoder 428. Power factors G1 414 and G2 424 applies to the data packets 413 and 423, respectively. At step 403, the encoded data packets 413 from NOMA encoder 418, and 423 from NOMA encoder 428 are superposed in the same time/frequency resource 404.

Although the data flows of different NOMA layers are independently configured, a joint symbol alignment (bit alignment) is needed, which puts a restriction on the size of the two transport blocks. To achieve simultaneous transmission of the different layer's services packet and decreasing the packet congestion at upper layer, MAC segmentation and padding (e.g., zero padding) may be used to meet the transport block size (TBS) required by physical layer. For example, if the right view data flow has not sufficient bits to transmit, the MAC padding is performed to produce the corresponding bit size before generating the MAC PDU. If the left view has larger bits than the transport block size, the MAC segmentation is performed. Moreover, in order to obtain robustness performance, lower MCS and modulation order will be chosen, the lower transport block size will be needed if the available RE number is fixed. Generally, the packet stream of left view (which is UHD) has more bits to transmit than the packet stream of right view (which is HD). The symbols from the multiple streams may not match that well, which raises the symbol alignment issue.

In one embodiment, a set of configuration parameters are predefined or preconfigured for super-positioning the multiple independently encoded data bits. From superposition transmission perspective, the symbol alignment among different layers is required. For example, assuming the modulated symbol numbers for one superposition transmission interval is S after two layers (e.g., base layer and enhanced layer) are encoded by NOMA encoder. Assuming that the combination factor considering the MCS and spreading factor for base layer and enhanced layer are F1 and F2, respectively, and the desired size of the transport blocks for base layer and enhanced layer are A1 and A2 respectively. The two-layer superposition configuration will satisfy the condition that F1*A1=F2*A2=S. Similarly, when the desired size of TBS for each configured NOMA layers are A1, A2, . . . An, and the combination factor considering MCS and spreading factor is configured to be F1, F2, . . . , Fn, the n-layer superposition configuration will satisfy F1*A1=F2*A2= . . . =Fn*An=S. Please note that in other embodiments, factors of MCS and spreading factor can be separate factors.

In one embodiment, padding and/or segmentation is performed for each independent NOMA layer. Assuming the TBS for the MAC PDU to be transmitted on NOMA layer-n is A, and the configured desired TBS for NOMA layer-n is A1, padding or segmentation is performed based on A and A1 for NOMA layer-n. When A<A1, padding is performed. (A1-A) bits are padded for the MAC PDU. When A>A1, the MAC PDU will be divided into $$\left\lceil \frac{A}{A1} \right\rceil$$

parts. The last part of the segmented data will be padded with $$A - A1 * \left\lfloor \frac{A}{A1} \right\rfloor$$

bits. According to one embodiment, the padding bit can be zero bit, and the invention is not limited by this. The following FIGS. 5A, 5B, 6A and 6B illustrates exemplary scenarios for NOMA encoder operations.

Figure 5A:
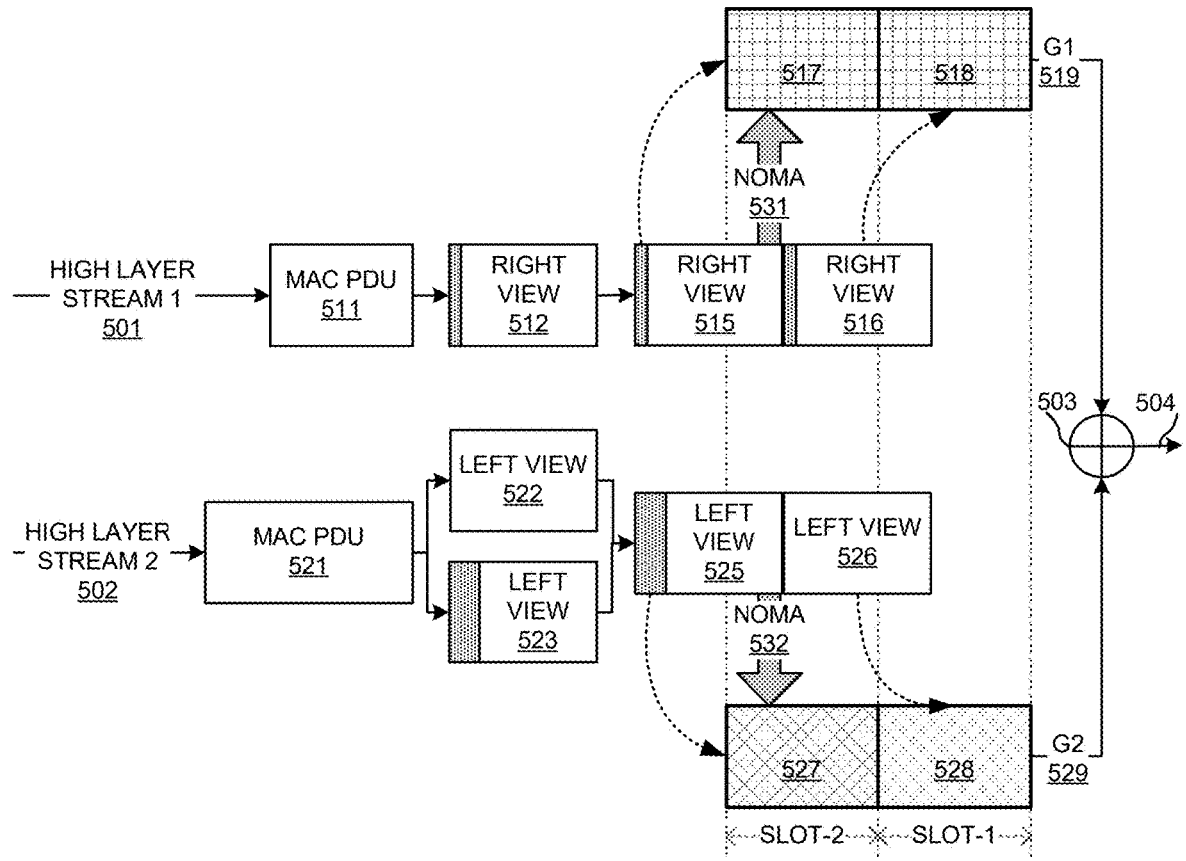
FIG. 5A illustrates an exemplary diagram with resolving symbol alignment when one layer's bits are more than corresponding transport block size and sequential transmission are used for the divided segments.

FIG. 5A illustrates an exemplary diagram with resolving symbol alignment when one layer's bits are more than corresponding transport block size and sequential transmission are used for the divided segments. Two data flows are delivered from the upper layer, stream-1 501 for the right view and stream-2 502 for the left view. Right view stream-1 501 from the upper layer are coded to MAC PDU 511. Left view stream-2 502 from the upper layer are coded to MAC PDU 521. The left view and right view packets are portioned and performing data padding when needed. In this example, right view MAC PDU 511 has a TBS size A_right smaller than configured TBS size A1 for NOMA layer-1. (A1-A_right) bits are padded for MAC PDU 511 resulting in new PDU for right view 512. Left view MAC PDU 521 has a TBS size A_left, which is bigger than configured TBS size A2 for NOMA layer-2. Left view MAC PDU 521 is segmented into two parts, left view part-1 522, and left view part-2 523. The segmentation left view part-1 522 is only information bits and no padding bits. The segmentation left view part-2 523 does not have enough bits to constitute a MAC ensemble.

$$A\_left - A2 * \left\lfloor \frac{A\_left}{A2} \right\rfloor$$

padding bits are added.

In one embodiment, the partitioned data packets are transmitted sequentially in different time slots. Right view packet 512 are repeated in the time domain as right view PDUs 515 and 516 in time slot-1 and slot-2, respectively. PDU 515 and 516 are put into NOMA encoder-1 531 and generates PDU 517 for time slot-2 and PDU 518 for time slot-1. Left view part-1 and left view part-2 are put sequentially in the time domain, with left view part-1 526 and left view part-2 525. PDU 526 and 525 are put through NOMA encoder-2 532 and generates encoded data 527 for time slot-2 and 528 for time slot-1. In the $1^{st}$ slot, time slot-1, the first segmentation of right view 518 and left view 528 will be transmitted in the same time/frequency domain 504. The right view's repetition 517 and $2^{nd}$ segment of left view 527 will be transmitted in the $2^{nd}$ slot, time slot-2. The right view and the left view will be superimposed at step 503 in the same slot, with power factor G1 519 for NOMA layer-1 and power factor G2 529 for NOMA layer-2.

At the receiver, UE will detect the combined data form the first slot and store them in HARQ buffer, until all the content associated with $1^{st}$ segmentation data are received. The enhanced layer will reconnect multiple MAC layer bits and deliver to upper layer and the base layer will do soft combine due to multiple repetition which can improve transmission performance for base layer services.

Figure 5B:
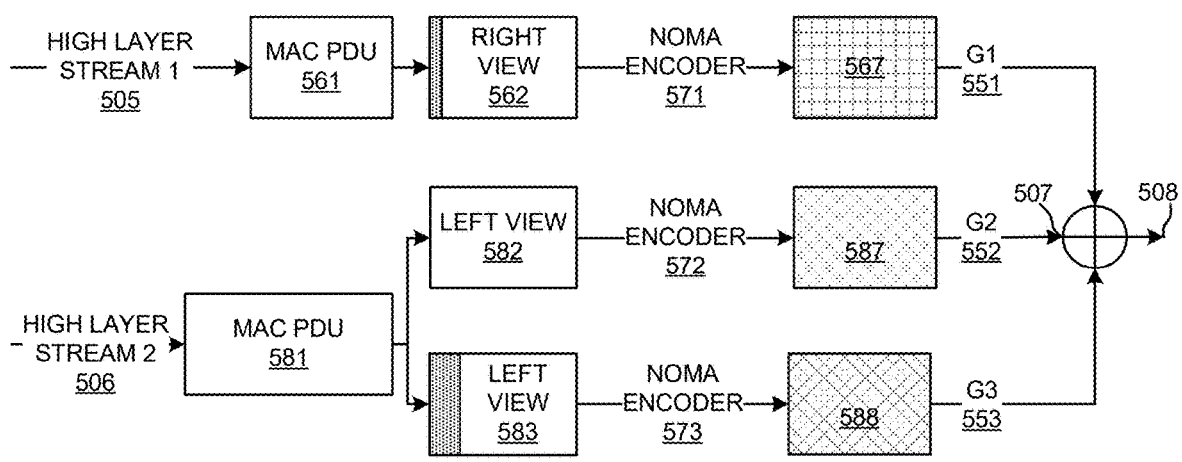
FIG. 5B illustrates an exemplary diagram with resolving symbol alignment when one layer's bits are more than corresponding transport block size and concurrent transmission are used for the divided segments.

FIG. 5B illustrates an exemplary diagram with resolving symbol alignment when one layer's bits are more than corresponding transport block size and concurrent transmission are used for the divided segments. Two data flows are delivered from the upper layer, stream-1 505 for the right view and stream-2 506 for the left view. Right view stream-1 505 from the upper layer are coded to MAC PDU 561. Left view stream-2 506 from the upper layer are coded to MAC PDU 581. The left view and right view packets are portioned and performing data padding when needed. In this example, right view MAC PDU 561 has a TBS size A_right smaller than configured TBS size A1 for NOMA layer-1. (A1-A_right) bits of are padded for MAC PDU 561 resulting in new PDU for right view 562. Left view MAC PDU 581 has a TBS size A_left, which is bigger than configured TBS size A2 for NOMA layer-2. Left view MAC PDU 581 is segmented into two parts, left view part-1 582, and left view part-2 583. The segmentation left view part-1 582 is only information bits and no padding bits. The segmentation left view part-2 583 does not have enough bits to constitute a MAC ensemble.

$$A\_left - A2 * \left\lceil \frac{A\_left}{A2} \right\rceil$$

padding bits are added.

In one embodiment, the partitioned data packets are transmitted concurrently in the same time slots. The two segmentation parts of enhanced layer/left view and base layer/right view MAC PDUs will be independently coded by NOMA encoder. Right view PDU 562 is put into NOMA layer-1 with encoder 571 and generates PDU 567. Left view part-1 582 and left view part-2 583 are put through NOMA layer-2 with encoder 572 and NOMA layer-3 with encoder 573, respectively, and generates encoded data 587 and 588. At step 507, the data from all layers are superimposed in the same time/frequency resource, with power factor G1 551 for NOMA layer-1 and power factor G2 552 for NOMA layer-2, and G3 553 for NOMA layer-3, and subsequently transmitted within one RF channel 508.

At the receiver, UE can detect all the enhanced layer data within one slot and can quickly reconnect the MAC PDU in order to deliver to upper layer, the processing latency will be decreased than the sequential processing.

Figure 6A:
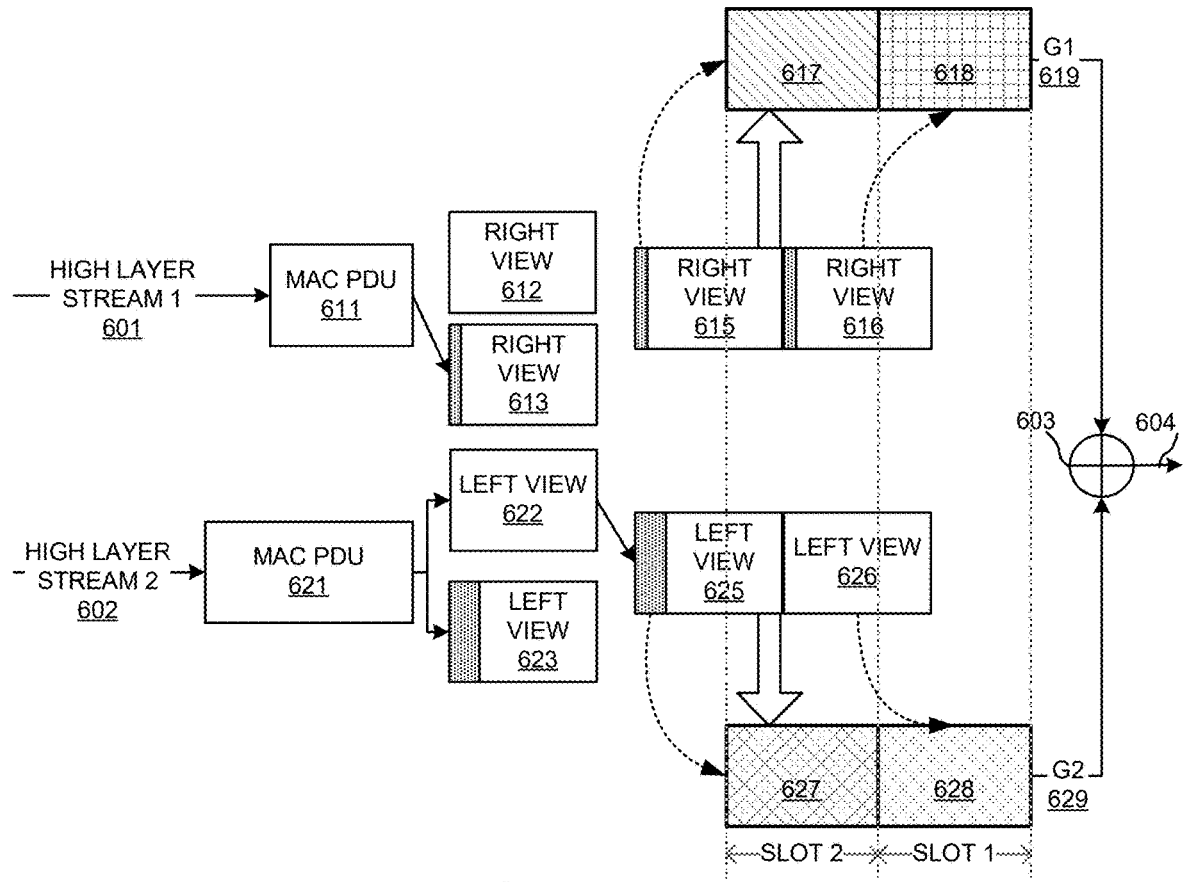
FIG. 6A illustrates an exemplary diagram with resolving symbol alignment when two layer's bits are more than corresponding transport block size and sequential transmission are used for the divided segments.

FIG. 6A illustrates an exemplary diagram with resolving symbol alignment when two layer's bits are more than corresponding transport block size and sequential transmission are used for the divided segments. Two data flows are delivered from the upper layer, stream-1 601 for the right view and stream-2 602 for the left view. Right view stream-1 601 from the upper layer are coded to MAC PDU 611. Left view stream-2 602 from the upper layer are coded to MAC PDU 621. The left view and right view packets are portioned and performing data padding when needed. In this example, right view MAC PDU 611 has a TBS size A_right bigger than configured TBS size A1 for NOMA layer-1. PDU 611 is segmented into two parts, right view part-1 612, and right view part-2 613. The segmentation right view part-1 612 is only information bits and no padding bits. The segmentation right view part-2 613 does not have enough bits to constitute a MAC ensemble.

$$A\_right - A1 * \left\lceil \frac{A\_right}{A1} \right\rceil$$

padding bits are added right view. MAC PDU 621 has a TBS size A_left, which is bigger than configured TBS size A2 for NOMA layer-2. Left view MAC PDU 621 is segmented into two parts, left view part-1 622, and left view part-2 623. The segmentation left view part-1 622 is only information bits and no padding bits. The segmentation left view part-2 623 does not have enough bits to constitute a MAC ensemble.

$$A\_left - A2 * \left\lceil \frac{A\_left}{A2} \right\rceil$$

padding bits are added.

In one embodiment, the partitioned data packets are transmitted sequentially in different time slots. Right view part-1 616 and right view part-2 615 are put sequentially in the time domain. PDU 616 and 615 are put through NOMA encoder-1 631 and generates encoded data 617 for time slot-2 and 618 for time slot-1. Left view part-1 and left view part-2 are put sequentially in the time domain, with left view part-1 626 and left view part-2 625. PDU 626 and 625 are put through NOMA encoder-2 632 and generates encoded data 627 for time slot-2 and 628 for time slot-1. In the $1^{st}$ slot, time slot-1, the first segmentation of right view 618 and left view 628 will be transmitted in the same time/frequency domain 604. The $2^{nd}$ segment of right view 617 and $2^{nd}$ segment of left view 627 will be transmitted in the $2^{nd}$ slot, time slot-2. The right view and the left view will be superimposed at step 603 in the same slot, with power factor G1 619 for NOMA layer-1 and power factor G2 629 for NOMA layer-2.

At the receiver, UE will detect the combined data form the first slot and store them in HARQ buffer, until all the content associated with $1^{st}$ segmentation data are received. The enhanced layer will reconnect multiple MAC layer bits and deliver to upper layer and the base layer will do soft combine due to multiple repetition which can improve transmission performance for base layer services.

Figure 6B:
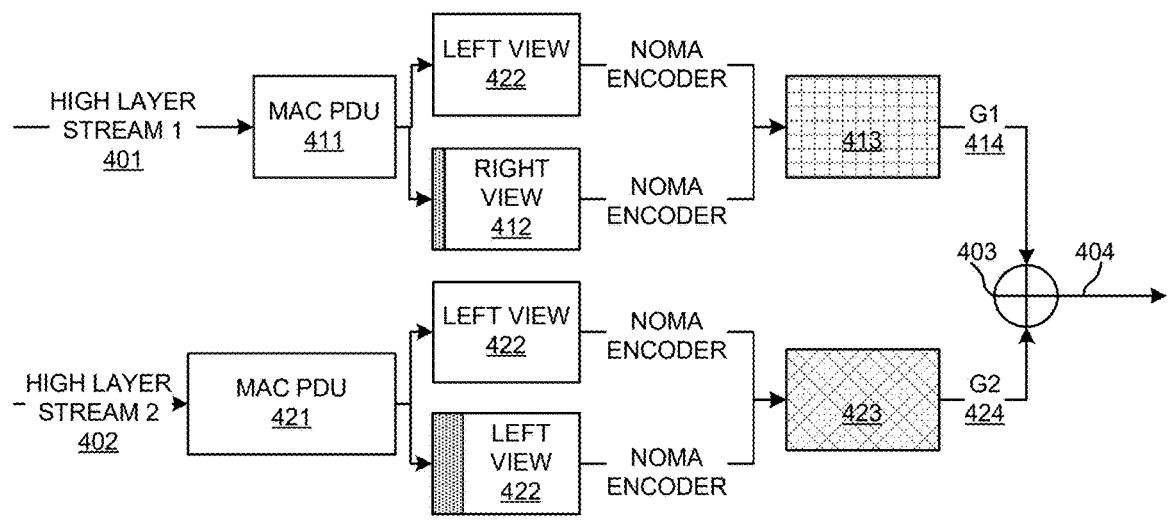
FIG. 6B illustrates an exemplary diagram with resolving symbol alignment when two layer's bits are more than corresponding transport block size and concurrent transmission are used for the divided segments.

FIG. 6B illustrates an exemplary diagram with resolving symbol alignment when two layer's bits are more than corresponding transport block size and concurrent transmission are used for the divided segments. Two data flows are delivered from the upper layer, stream-1 605 for the right view and stream-2 606 for the left view. Right view stream-1 605 from the upper layer are coded to MAC PDU 661. Left view stream-2 606 from the upper layer are coded to MAC PDU 681. The left view and right view packets are portioned and performing data padding when needed. In this example, right view MAC PDU 661 has a TBS size A_right bigger than configured TBS size A1 for NOMA layer-1. PDU 661 is segmented into two parts, right view part-1 662, and right view part-2 663. The segmentation right view part-1 662 is only information bits and no padding bits. The segmentation right view part-2 663 does not have enough bits to constitute a MAC ensemble.

$$A\_right - A1 * \left\lceil \frac{A\_right}{A1} \right\rceil$$

padding bits are added. Left view MAC PDU 681 has a TBS size A_left, which is bigger than configured TBS size A2 for NOMA layer-2. Left view MAC PDU 681 is segmented into two parts, left view part-1 682, and left view part-2 683. The segmentation left view part-1 682 is only information bits and no padding bits. The segmentation left view part-2 683 does not have enough bits to constitute a MAC ensemble.

$$A\_left - A2 * \left\lceil \frac{A\_left}{A2} \right\rceil$$

padding bits are added.

In one embodiment, the partitioned data packets are transmitted concurrently in the same time slots. The two segmentation parts of enhanced layer/left view and base layer/right view MAC PDUs will be independently coded by NOMA encoder. Right view PDU 662 and PDU 663 put into NOMA layer-1 with encoder 671 and NOMA layer-2 with encoder 672, respectively, and generates encoded data 667 and 668. Left view part-1 682 and left view part-2 683 are put are put through NOMA layer-3 with encoder 673 and NOMA layer-4 with encoder 674, respectively, and generates encoded data 687 and 688. At step 607, the data from all layers are superimposed in the same time/frequency resource, with power factor G1 651 for NOMA layer-1 and power factor G2 652 for NOMA layer-2, and G3 653 for NOMA layer-3, and G4 654 for NOMA layer-4, and subsequently transmitted within one RF channel 608.

At the receiver, UE can detect all the enhanced layer data within one slot and can quickly reconnect the MAC PDU in order to deliver to upper layer, the processing latency will be decreased than the sequential processing.

Figure 7:
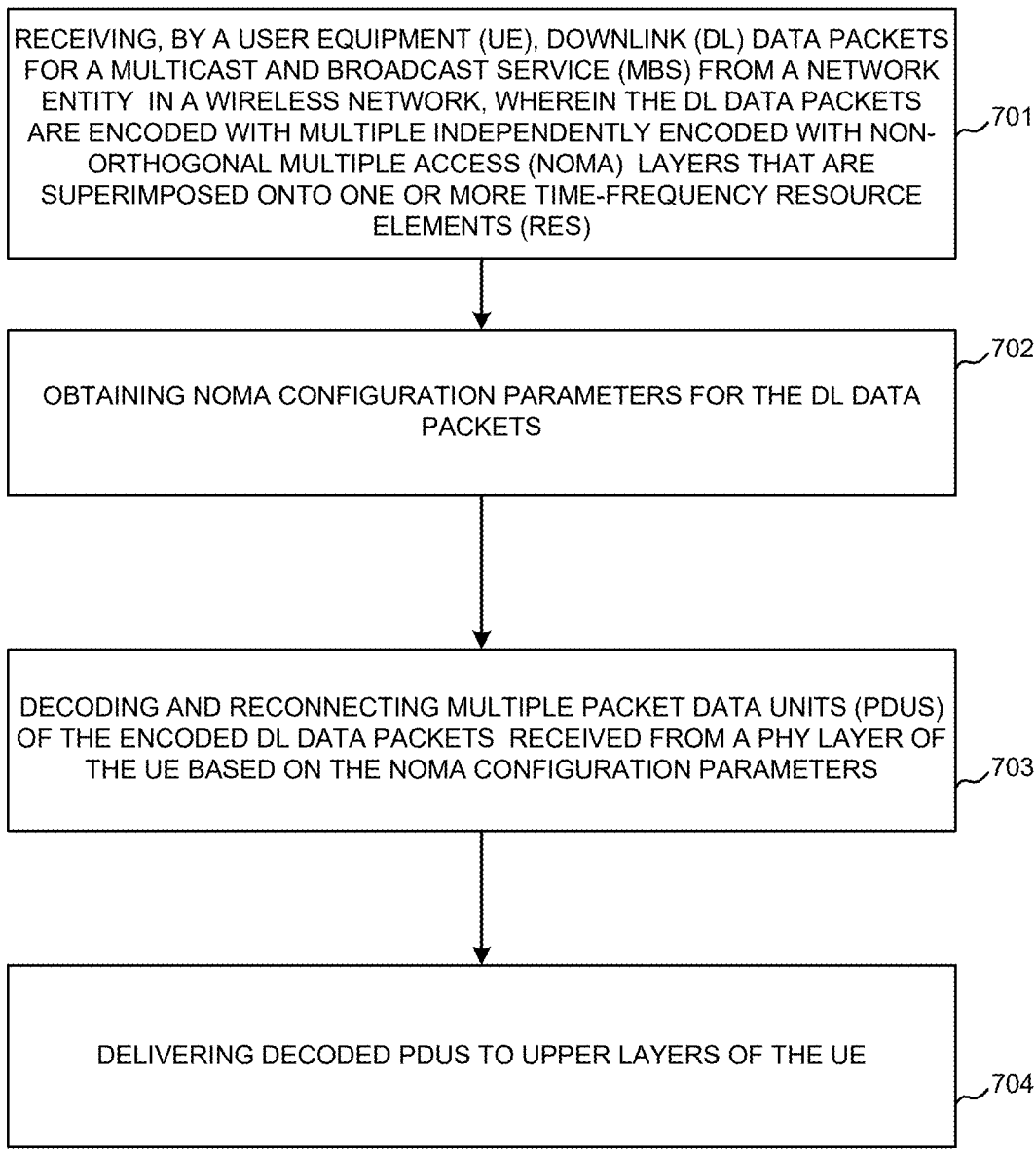
FIG. 7 illustrates an exemplary flow chart for the UE to process simultaneous transmission of multiple MBS sessions using DL NOMA.

FIG. 7 illustrates an exemplary flow chart for the UE to process simultaneous transmission of multiple MBS sessions using DL NOMA. At step 701, the UE receives DL data packets for a MBS from a network entity in a wireless network, wherein the DL data packets are encoded with multiple independently encoded NOMA layers that are superimposed onto one or more time-frequency resource elements (REs). At step 702, the UE obtains NOMA configuration parameters for the DL data packets. At step 703, the UE decodes and reconnects multiple PDUs of the encoded DL data packets received from a PHY layer of the UE based on the NOMA configuration parameters. At step 704, the UE delivers decoded PDUs to upper layers of the UE.

Figure 8:
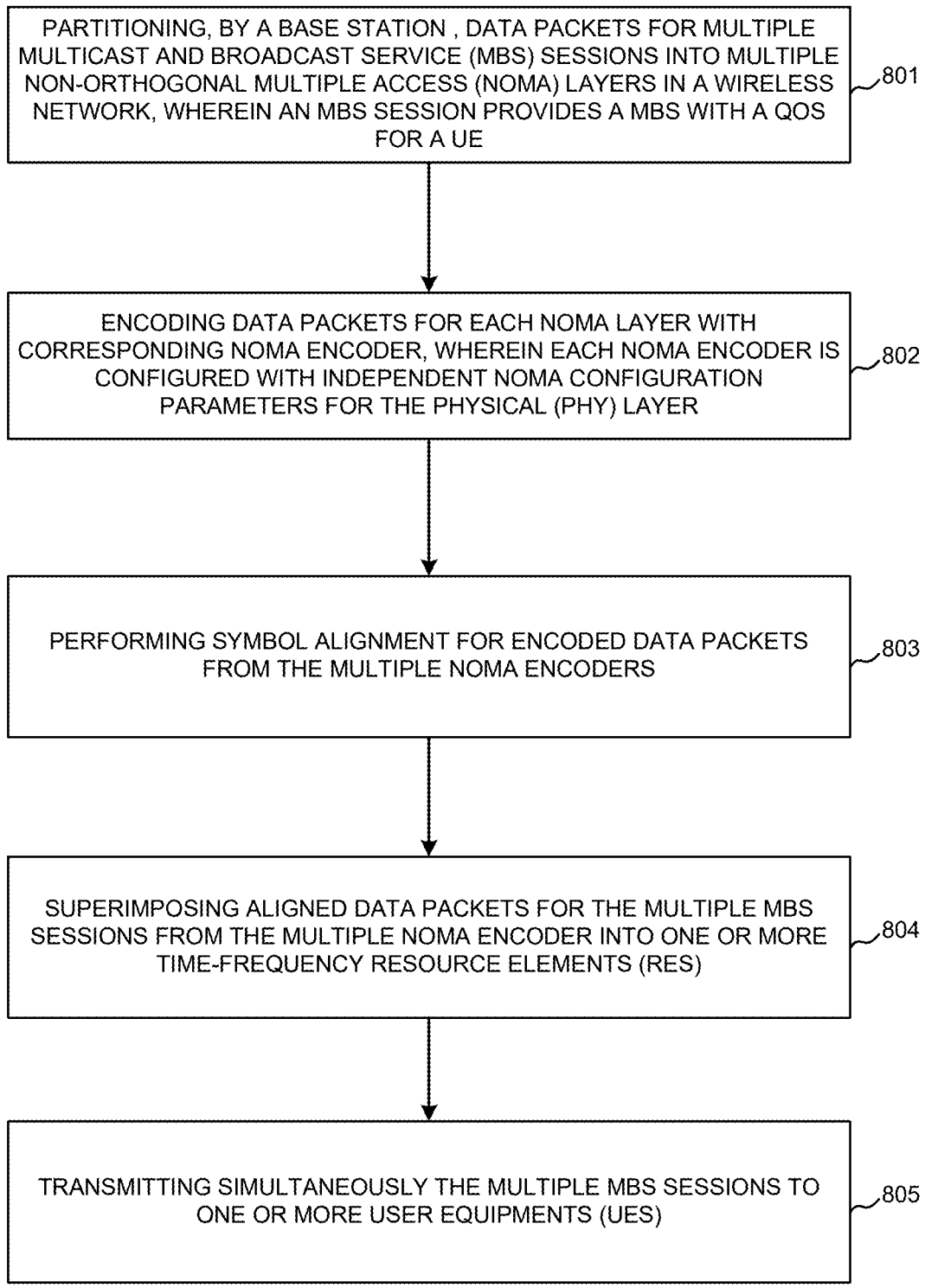
FIG. 8 illustrates an exemplary flow chart for the gNB to simultaneously transmits multiple MBS sessions using DL NOMA.

FIG. 8 illustrates an exemplary flow chart for the base station (e.g., gNB) to simultaneously transmits multiple MBS sessions using DL NOMA. At step 801, the base station partitions data packets for multiple MBS sessions into multiple non-orthogonal multiple access (NOMA) layers in a wireless network, wherein an MBS session provides a MBS with a QoS for a UE. At step 802, the base station encodes data packets for each NOMA layer with corresponding NOMA encoder, wherein each NOMA encoder is configured with independent NOMA configuration parameters for the physical (PHY) layer. At step 803, the base station performs symbol alignment for encoded data packets from the multiple NOMA encoders. At step 804, the base station superimposes aligned data packets for the multiple MBS sessions into one or more time-frequency resource elements (REs). At step 805, the base station transmits simultaneously the multiple MBS sessions to one or more UEs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving, by a user equipment (UE), downlink (DL) data packets for a multicast and broadcast service (MBS) from a network entity in a wireless network, wherein the DL data packets are encoded with multiple independently encoded non-orthogonal multiple access (NOMA) layers that are superimposed onto one or more time-frequency resource elements (REs);
   obtaining NOMA configuration parameters for the DL data packets; decoding and reconnecting multiple packet data units (PDUs) of the encoded DL data packets received from a PHY layer of the UE based on the NOMA configuration parameters, wherein symbols of the DL data packets from multiple NOMA layers are aligned with one or more symbol alignment procedures based on NOMA configuration and the MBS; and
   delivering decoded PDUs to upper layers of the UE.

2. The method of claim 1, wherein each NOMA layer is independently encoded with different NOMA configuration parameters comprising modulation and coding scheme (MCS) and spreading sequences.

3. The method of claim 1, wherein the UE obtains the NOMA configuration parameters from a modified downlink control information (DCI) received from the wireless network.

4. The method of claim 3, wherein the NOMA configuration parameters are defined within one group common DCI with each MCS field corresponding to one UE.

5. The method of claim 3, wherein a mixed NOMA configuration parameter table is configured containing all NOMA configuration parameter combinations for UEs.

6. The method of claim 3, wherein the modified DCI is a unicast DCI to inform one or more NOMA configuration parameters.

7. The method of claim 2, wherein the NOMA configuration parameters further comprising channel encoder, and power ratio.

8. A method comprising:
   partitioning, by a base station, data packets for multiple multicast and broadcast service (MBS) sessions into multiple non-orthogonal multiple access (NOMA) layers in a wireless network, wherein an MBS session provides a MBS with a QoS for a UE;
   encoding data packets for each NOMA layer with corresponding NOMA encoder, wherein each NOMA encoder is configured with independent NOMA configuration parameters for the physical (PHY) layer;
   performing symbol alignment with one or more symbol alignment procedures for encoded data packets from the multiple NOMA encoders based on NOMA configuration and the MBS;
   superimposing aligned data packets for the multiple MBS sessions into one or more time-frequency resource elements (REs); and
   transmitting simultaneously the multiple MBS sessions to one or more user equipments (UEs).

9. The method of claim 8, wherein the partitioning involves one or more procedures for each NOMA layer comprising segmentation and padding.

10. The method of claim 9, wherein padding is performed for data packets partitioned for a NOMA layer when a size of the data packets for the corresponding NOMA layer is smaller than a transport block size configured for the corresponding NOMA layer.

11. The method of claim 9, wherein data segmentation is performed for a NOMA layer and sequential transmission of each data segment is performed.

12. The method of claim 9, wherein data segmentation is performed for a NOMA layer and concurrent transmission of each data segment is performed.

13. The method of claim 8, further comprising:
transmitting the NOMA configuration parameters to the one or more UEs using a modified downlink control information (DCI).

14. A user equipment (UE), comprising:
a transceiver that transmits and receives radio frequency (RF) signal in a wireless network;
a memory, and
a processor coupled to the memory, the processor configured to
receive downlink (DL) data packets for an MBS from a network entity in the wireless network, wherein the DL data packets are encoded with multiple independently encoded non-orthogonal multiple access (NOMA) layers that are superimposed onto one or more time-frequency resource elements (REs);
obtain NOMA configuration parameters for the DL data packets;
decode and reconnect multiple packet data units (PDUs) of the encoded DL data packets received from a PHY layer of the UE based on the NOMA configuration parameters, wherein symbols of the DL data packets from multiple NOMA layers are aligned with one or more symbol alignment procedures based on NOMA configuration and the MBS; and
deliver decoded PDUs to upper layers of the UE.

15. The UE of claim 14, wherein each NOMA layer is independently encoded with different NOMA configuration parameters comprising modulation and coding scheme (MCS) and spreading sequences.

16. The UE of claim 14, wherein the UE obtains the NOMA configuration parameters from a modified downlink control information (DCI) received from the wireless network.

17. The UE of claim 16, wherein the NOMA configuration parameters are defined within one group common DCI with each MCS field corresponding to one UE.

18. The UE of claim 16, wherein a mixed NOMA configuration parameter table is configured containing all NOMA configuration parameter combinations for UEs.

19. The UE of claim 16, wherein the modified DCI is a unicast DCI to inform one or more NOMA configuration parameters.

20. The UE of claim 15, wherein the NOMA configuration parameters further comprising channel encoder, and power ratio.

* * * * *